(12) United States Patent
Satoda

(10) Patent No.: US 6,563,528 B2
(45) Date of Patent: May 13, 2003

(54) VIDEO CONFERENCE SYSTEM

(75) Inventor: Kozo Satoda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/962,606

(22) Filed: Sep. 26, 2001

(65) Prior Publication Data

US 2002/0041324 A1 Apr. 11, 2002

(30) Foreign Application Priority Data

Sep. 29, 2000 (JP) ........................................ 2000-300657

(51) Int. Cl.[7] ................................................. H04N 7/14
(52) U.S. Cl. ............................... 348/14.05; 348/14.08; 348/14.09
(58) Field of Search .......................... 348/14.01–14.09, 348/14.1, 14.11, 14.12, 14.13, 14.16; 709/204, 205; 345/753, 751, 755; 370/260; H04N 7/14

(56) References Cited

U.S. PATENT DOCUMENTS

2001/0019355 A1    9/2001  Koyanagi et al. .............. 348/36

FOREIGN PATENT DOCUMENTS

| JP | 5-122689 | 5/1993 |
| JP | 7-140527 | 6/1995 |
| JP | 8-298652 | 11/1996 |
| JP | 11-8844 | 1/1999 |

OTHER PUBLICATIONS

Cohen et al. ; Automatic Determination . . . in Video–Conferences; Jun. 29, 2000; WO 00/38414.*
Ojala et al. ; Video Conference Equipment; May 7, 1998; WO 98/19458.*

* cited by examiner

Primary Examiner—Melur Ramakrishnaiah
(74) Attorney, Agent, or Firm—Foley & Lardner

(57) ABSTRACT

A video conference system includes a camera, camera driving section, human figure extracting section, human figure picture storage section, camera parameter storage section, and human figure instructing section. The imaging direction and field angle of the view of the camera can be changed. The camera driving section controls the imaging direction and field angle of the camera view in accordance with camera parameters. The human figure extracting section extracts a human figure picture of each participant from a picture obtained by capturing an entire conference room, and calculates camera parameters associated with the imaging direction and field angle of the camera view on the basis of the extracted human figure picture. The human figure picture storage section stores the extracted human figure picture. The camera parameter storage section stores the camera parameters calculated by the human figure extracting section. The human figure instructing section reads out camera parameters corresponding to a human figure picture selected as a shooting target from the human figure pictures stored in the human figure picture storage section from the camera parameter storage section, and outputs the camera parameters to the camera driving section.

13 Claims, 4 Drawing Sheets

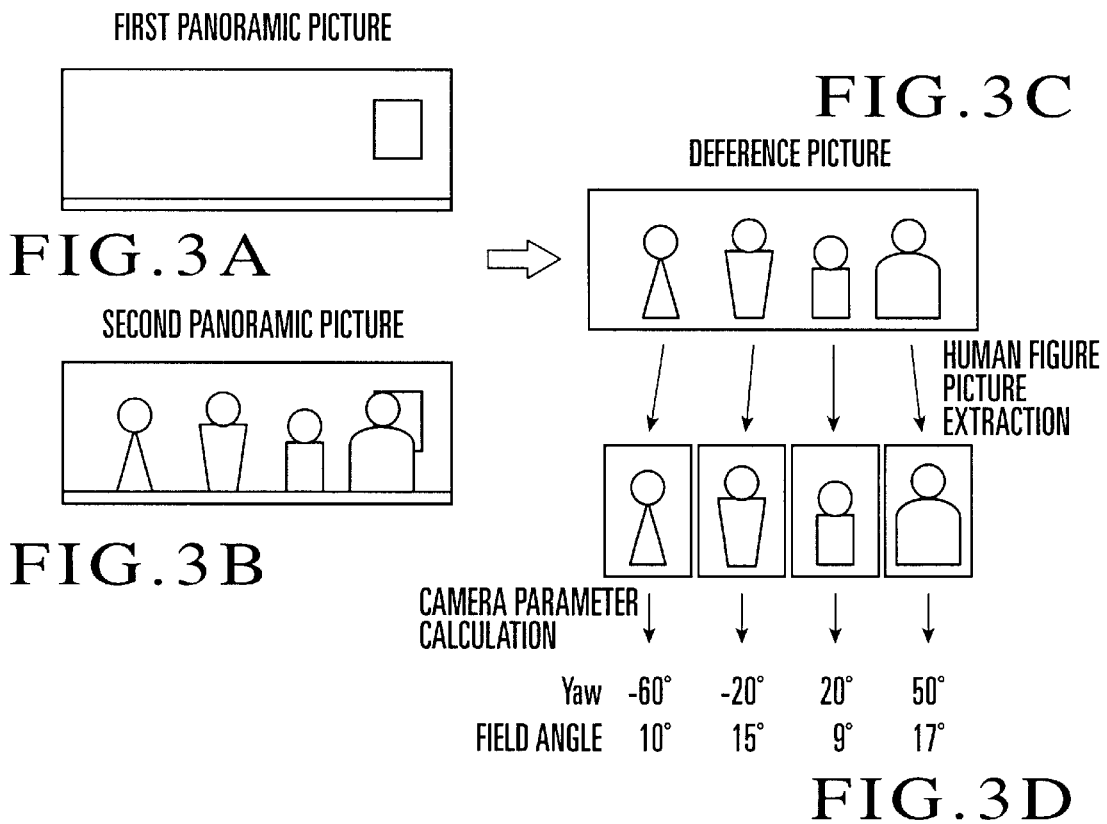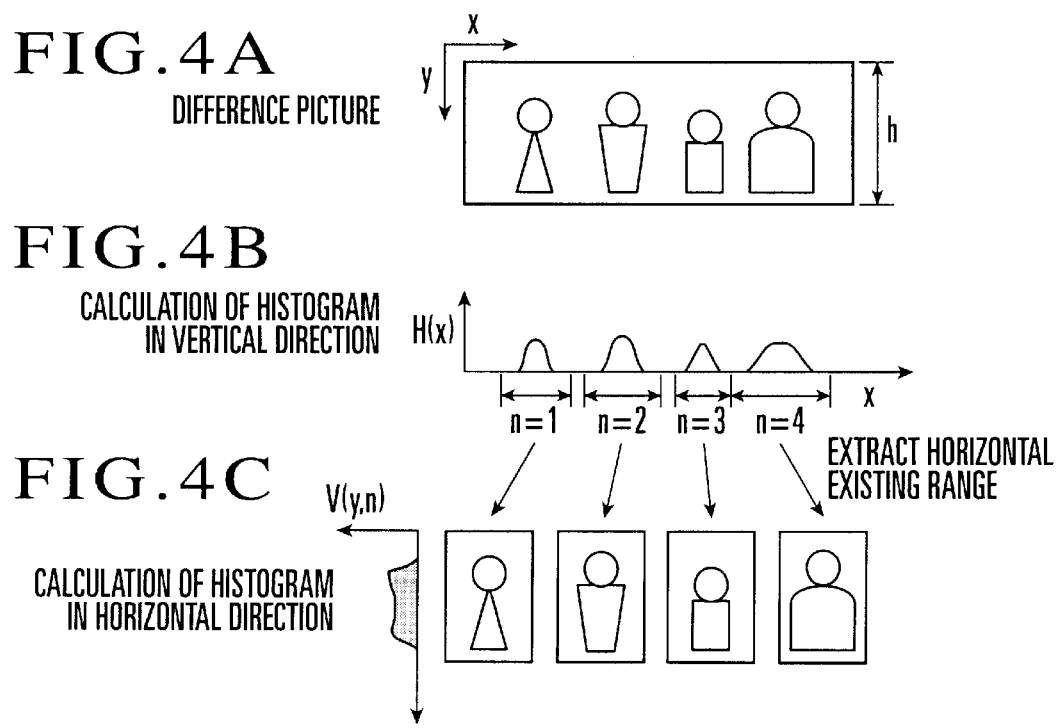

FIG.5A
FIRST PANORAMIC PICTURE
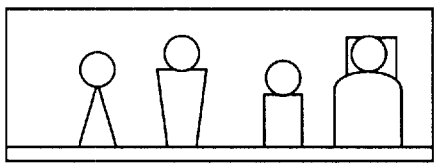
FIG.5B
SECOND PANORAMIC PICTURE
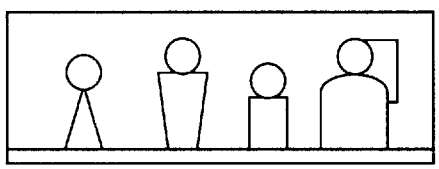
FIG.5C
DIFFERENCE PICTURE
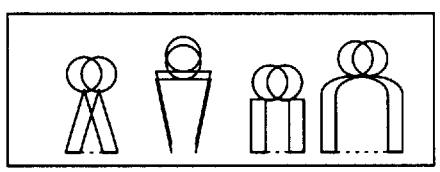
CALCULATION OF HISTOGRAM IN VERTICAL DIRECTION
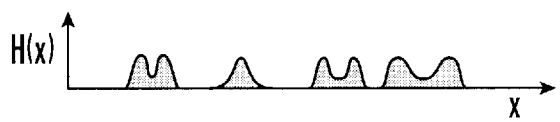
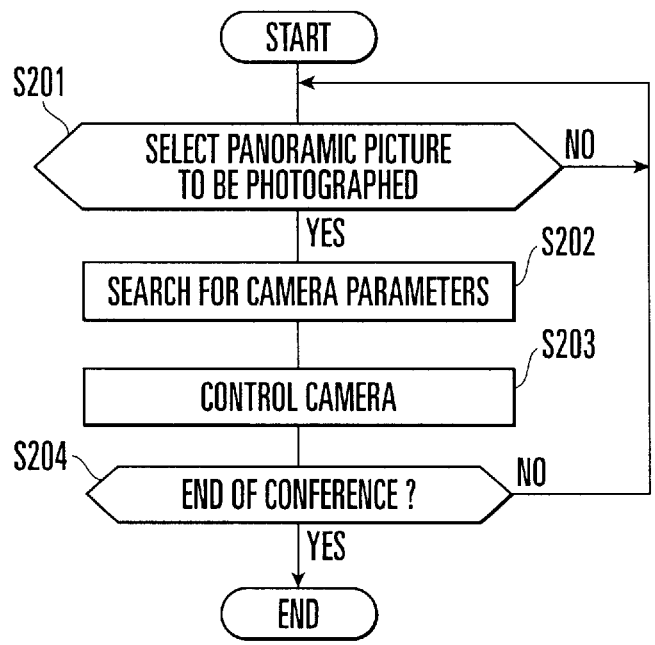
FIG.6

VIDEO CONFERENCE SYSTEM

BACKGROUND OF THE INVENTION

The present invention relates to a video conference system for properly imaging a speaker in a conference by controlling the imaging direction and field angle of the camera view.

In a conventional video conference, a motor drive camera whose imaging direction and field angle of the camera view can be adjusted to generate images of a picture of a participant is used. Conventionally, in a video conference in which plural persons participate, the imaging direction and field angle of the camera view are manually selected to transmit a picture or the like of a speaker to remote participants. With a conventional camera control interface, an operator operates buttons to designate change amounts associated with the imaging direction and field angle of the camera view. Since the operator cannot perform such operation intuitively, it takes much time to correctly direct the camera to a speaker, interfering with the progress of a conference.

In order to solve this problem, controllers for automatically detecting a speaker and directing a camera toward the speaker have been proposed. For example, Japanese Patent Laid-Open No. 5-122689 (reference 1) discloses a video conference system which detects a microphone of plural microphones which exhibits the highest voice level and directs a camera toward the detected microphone. Japanese Patent Laid-Open No. 7-140527 (reference 2) discloses a camera imaging controller which detects the direction in which voices are heard on the basis of the differences in phase between voices input to a microphone. According to references 1 and 2, a speaker is detected on the basis of the direction of speech, and the direction and the like of a camera are controlled to generate images of a speaker picture.

In addition, techniques of capturing a participant with a camera and detecting the participant from the resultant image. For example, Japanese Patent Laid-Open No. 8-298652 (reference 3) discloses a camera direction controller for a video conference terminal, which detects the contour of a human figure from a captured image upon directing a camera in the direction in which speech is detected, and correcting the direction of the camera. Japanese Patent Laid-Open No. 11-8844 (reference 4) discloses an image sensing apparatus controller which displays the movable range of a camera, in which panning and tilting can be performed, as a panoramic image, and allows an operator to designate an arbitrary area within the panoramic image, thereby easily directing a camera toward the designated area.

In the methods proposed by references 1 and 2, in which the direction of a speaker is detected from speech, a directional error is large, and hence it is difficult to control the camera to set the speaker in the center of a frame. In addition, since the size of a speaker cannot be detected, a proper field angle of the camera view cannot be set for the speaker.

In the method proposed by reference 3, in which detection is performed by using images, participants other than a speaker are also detected. In the conventional methods of detecting a speaker by using speech and images and setting a camera in the detected direction, therefore, the direction and field angle of the camera view must be further corrected manually.

In the method proposed by reference 4, the direction of a camera can be controlled by designating an area where generating images is to be performed within a panoramic image. In this method, however, even in a case where people do not move much once they are seated as in a video conference, a shooting area must be designated on a panoramic image every time the direction of the camera is changed, resulting in cumbersome operation.

SUMMARY OF THE INVENTION

It is an object of the present invention to provide a video conference system which can easily designate a participant to be captured in a video conference.

It is another object of the present invention to provide a video conference system which can properly generate images of a participant.

In order to achieve the above objects, according to the present invention, there is provided a video conference system comprising a camera whose imaging direction and field angle of the view can be changed, camera driving means for controlling the imaging direction and field angle of the camera view in accordance with camera parameters, human figure extracting means for extracting a human figure picture of each participant from a picture obtained by generating an image of an entire conference room with the camera, and calculating camera parameters associated with the imaging direction and field angle of the camera view with respect to each participant on the basis of the extracted human figure picture, human figure picture storage section for storing the human figure picture extracted by the human figure extracting means, camera parameter storage means for storing the camera parameters calculated by the human figure extracting means, and human figure instructing means for reading out from the camera parameter storage section camera parameters corresponding to a human figure picture selected as a shooting target from the human figure pictures stored in the human figure picture storage means, and outputting the camera parameters to the camera driving means.

BRIEF DESCRIPTION OF THE DRAWINGS

FIGS. 3A to 3D are views for explaining human figure extracting operation performed by the human figure extracting section in FIG. 1;

FIGS. 4A to 4C are views for explaining human figure picture extracting operation performed by a human figure picture extracting section in FIG. 1;

FIGS. 5A to 5C are views for explaining human figure picture extracting operation performed by the human figure picture extracting section when no pictures of a conference room with any participants can be obtained;

FIG. 6 is a flow chart showing the operation of a human figure instructing section in FIG. 1.

DESCRIPTION OF THE PREFERRED EMBODIMENT

The present invention will be described in detail below with reference to the accompanying drawings.

Figure 1:
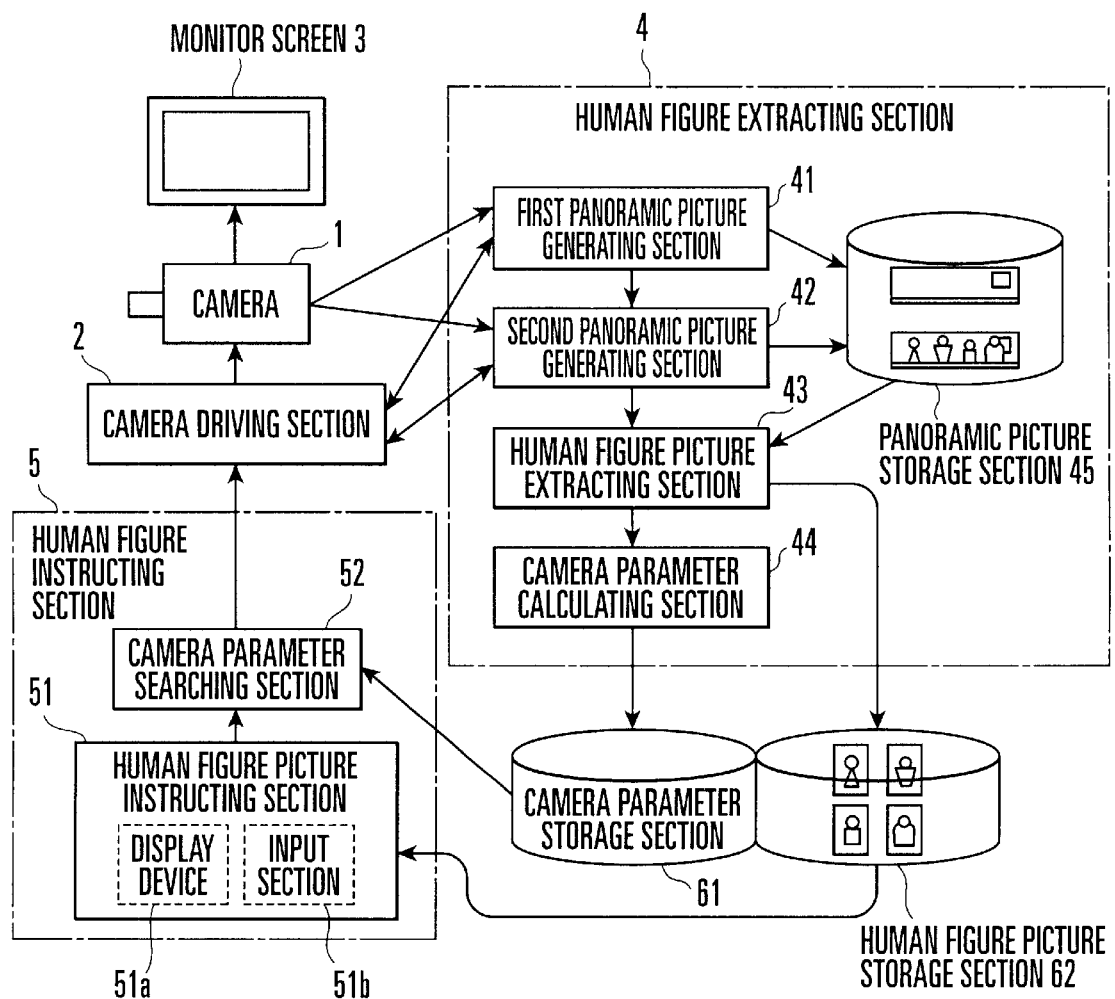
FIG. 1 is a block diagram showing a video conference system according to an embodiment of the present invention.

FIG. 1 shows a video conference system according to an embodiment of the present invention. The video conference system of this embodiment includes a camera 1 whose imaging direction and field angle of the view can be changed, a camera driving section 2 for controlling the imaging direction and field angle of the view of the camera 1, a monitor screen 3 for monitoring the image captured by the camera 1, a human figure extracting section 4 for receiving a generated image from the camera 1 and outputting a driving control signal to the camera driving section 2, a camera parameter storage section 61 for storing the camera parameters output from the human figure extracting section 4, a human figure picture storage section 62 for storing the human figure picture information output from the human figure extracting section 4, and a human figure instructing section 5 for receiving information from the camera parameter storage section 61 and human figure picture storage section 62 and outputting a driving control signal to the camera driving section 2.

The human figure extracting section 4 includes a first panoramic picture generating section 41, second panoramic picture generating section 42, human figure picture extracting section 43, camera parameter calculating section 44, and panoramic picture storage section 45. The human figure instructing section 5 includes a human figure picture instructing section 51 having a display device 51a for displaying a human figure picture of each participant and an input section 51b such as a mouse or keyboard that is operated by the operator of a video conference, and a camera parameter searching section 52.

To perform camera control in a video conference, processing is performed in two steps. In the first step as the initial stage of the conference, the human figure extracting section 4 performs human figure extraction processing in the early stage of the conference. The human figure extracting section 4 extracts a picture of each participant in the conference from a picture of the overall conference room that is captured by the camera 1. The extracted picture of each participant is stored in the human figure picture storage section 62. The human figure extracting section 4 calculates, for each participant picture, an imaging direction and field angle of the view as camera parameters with which each participant is properly captured by the camera 1, and stores the parameters in the camera parameter storage section 61.

In the second step, the human figure instructing section 5 performs processing during the conference. The human figure instructing section 5 selects a human figure picture of a participant to be captured from the human figure pictures stored in the human figure picture storage section 62 during the conference in accordance with the operation performed by the operator, thus controlling the camera driving section 2 to place the camera 1 in a proper direction.

Figure 2:
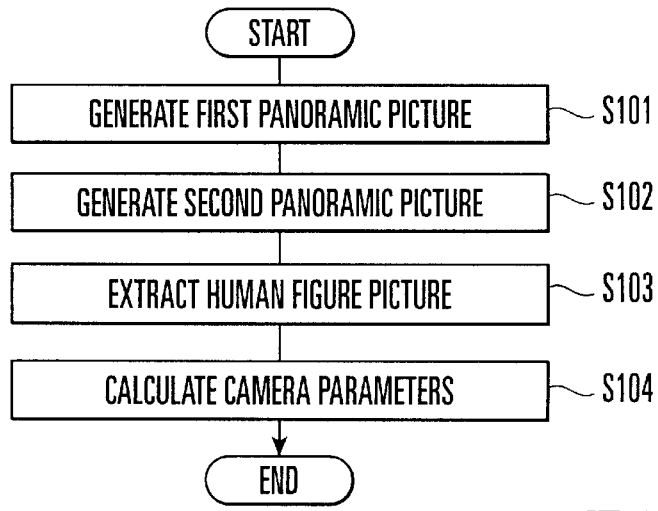
FIG. 2 is a flow chart showing the operation of a human figure extracting section in FIG. 1.

The operation of the human figure extracting section 4 will be described in detail next with reference to the flow chart of FIG. 2.

First of all, in a state in which no participant is present in a conference room, the first panoramic picture generating section 41 instructs the camera driving section 2 to generate images inside the conference room in all directions in which capturing can be performed. The first panoramic picture generating section 41 concatenates plural pictures generated by the camera 1 to generate a panoramic picture of a conference room with no participants (to be referred to as a first panoramic picture hereinafter) (step S101), as shown in FIG. 3A.

A panoramic picture may be generated as follows. To eliminate overlaps of joints and the like of pictures, as disclosed in reference 4, a virtual spherical surface may be set around the camera, and the respective pictures generated by the camera may be concatenated to each other after they are mapped on the virtual spherical surface. If, however, camera control in the video conference is an object, since slight pixel offsets have no influence on the subsequent processing, the respective pictures may be simply concatenated to each other. The first panoramic picture generated in this manner is stored in the panoramic picture storage section 45.

Subsequently, in a state in which participants are seated in the conference room, the second panoramic picture generating section 42 performs the same operation as the first panoramic picture generating section 41 to generate a panoramic picture of the conference room in which the participants are present (to be referred to as a second panoramic picture hereinafter) (step S102), as shown in FIG. 3B. Like the first panoramic picture, the generated second panoramic picture is also stored in the panoramic picture storage section 45.

When the first and second panoramic pictures are generated, the human figure picture extracting section 43 extracts a picture of each participant (to be referred to as a human figure picture hereinafter) from the two panoramic pictures (step S103). The human figure extraction processing in step S103 will be described in detail below.

First of all, the human figure picture extracting section 43 reads out the first and second panoramic pictures from the panoramic picture storage section 45, and obtains the difference between the first and second panoramic pictures. Since the second panoramic picture includes the participants in the conference, only an image region of each participant can be extracted by taking difference between the first and second panoramic pictures, as shown in FIG. 3C.

Subsequently, as shown in FIG. 3D, the human figure picture extracting section 43 extracts each human figure picture from the extracted difference picture. The processing of extracting each human figure picture will be described with reference to FIGS. 4A to 4C. Let Y1(x, y) be the luminance at a pixel position (x, y) in the first panoramic picture, and Y2(x, y) be the luminance at a pixel (x, y) in the second panoramic picture.

When the human figure picture extracting section 43 takes the difference between the first and second panoramic pictures, threshold processing is performed to convert the difference picture between the first and second panoramic pictures into a binary image. At this time, a difference picture D(x, y) at the pixel position (x, y) is obtained by using equations (1).

$$D(x, y)=0 \ (|Y1(x, y)-Y2(x, y)|<T)$$

$$D(x, y)=1 \ (|Y1(x, y)-Y2(x, y)|\geq T) \qquad (1)$$

where T is a predetermined threshold, and "| |" denotes an absolute value of the number. According to equations (1), the difference picture D(x, y) becomes "1" at a pixel in an area where a participant exists, and "0" at a pixel in an area where no participant exists.

As shown in FIG. 4B, the human figure picture extracting section 43 calculates a histogram H(x) in the vertical direction, which indicates the accumulation of pixel values at the respective x-coordinates, from the difference picture D(x, y). This histogram H(x) can be obtained by using equation (2):

$$H(x) = \sum_{y=1}^{h} D(x, y) \qquad (2)$$

where h is the height of a difference picture.

According to equation (2), the histogram H(x) in the vertical direction becomes a large value in a range in which a participant exists, and a small value in a range in which no participant exists. Therefore, a horizontal range in which a participant exists (to be referred to as a horizontal existing range hereinafter) can be extracted by extracting a range in which the histogram H(x) is a predetermined threshold or more from the difference picture D(x, y).

The human figure picture extracting section 43 then calculates a histogram V(y, n) in the horizontal direction which indicates the accumulation of pixel values at the respective y-coordinates with respect to the extracted horizontal existing range of the difference picture D(x, y). This histogram V(y, n) can be obtained by using equation (3):

$$V(y, n) = \sum_{x=1}^{wn} D(x, y) \qquad (3)$$

where n is the nth horizontal existing range extracted on the basis of the histogram H(x) in the vertical direction. The histogram V(y, n) is therefore a histogram in the horizontal direction which is associated with the nth extracted horizontal existing range. In addition, wn represents the size of the nth extracted existing range in the horizontal direction.

In equation (3), the histogram V(y, n) in the horizontal direction becomes a large value in a range in which a participant exists, and a small value in a range in which no participant exists or a participant is hidden behind a desk or the like. A range in which the histogram V(y, n) is a predetermined threshold or more can therefore be extracted as a vertical range in which a participant exists (to be referred as a vertical existing range hereinafter). In addition, a rectangular area (FIG. 4C) defined by the vertical existing range and the previously extracted horizontal existing range can be determined as an area where each participant exists.

The human figure picture extracting section 43 extracts a rectangular area where each participant exists from the difference picture D(x, y). The extracted area is stored as a human figure picture in the human figure picture storage section 62. With this operation, the human figure picture extraction processing in step S103 is terminated.

Figure 7:
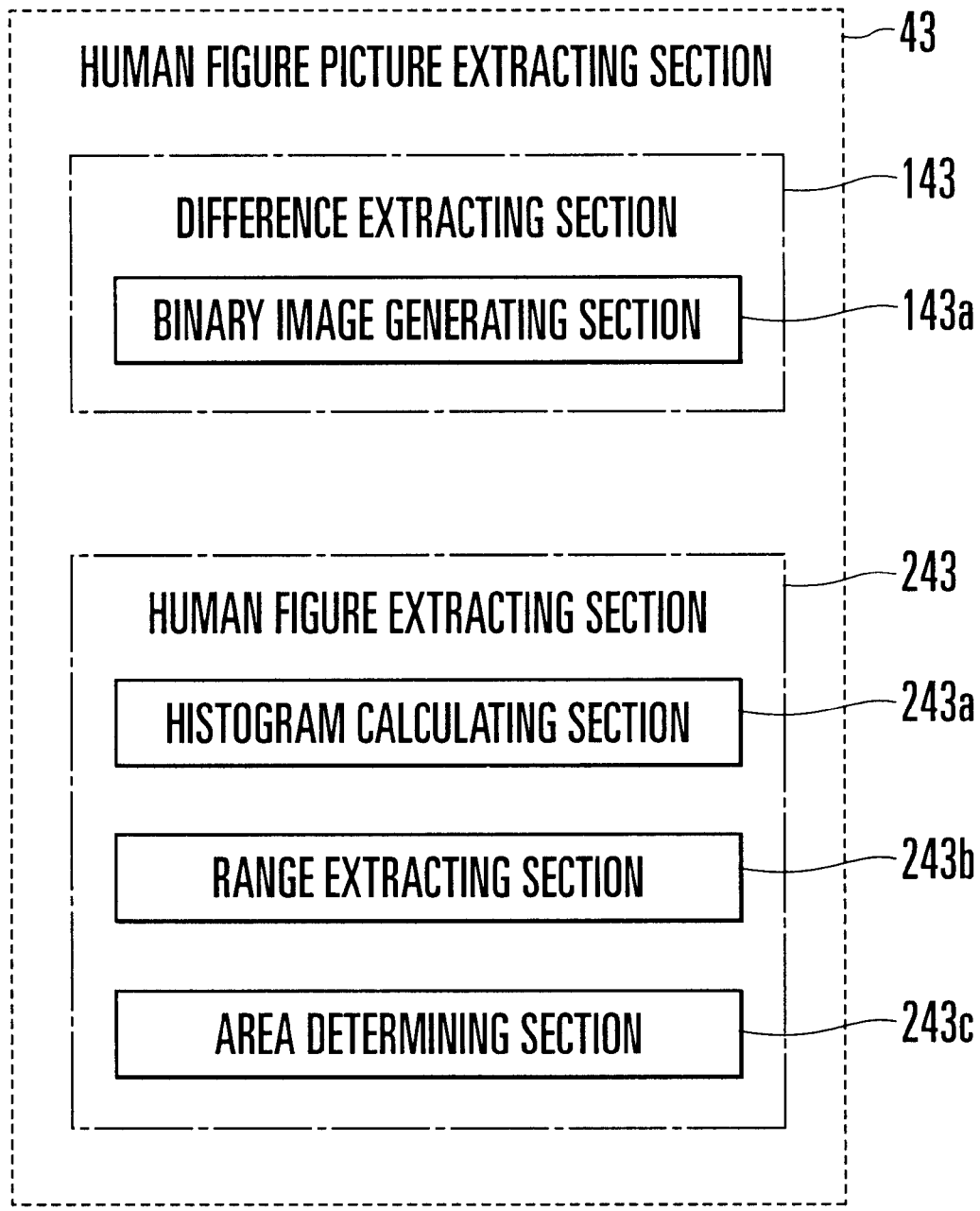
FIG. 7 is a block diagram showing the detailed arrangement of the human figure picture extracting section in FIG. 1.

FIG. 7 shows the detailed arrangement of the human figure picture extracting section 43. Referring to FIG. 7, the human figure picture extracting section 43 includes a difference extracting section 143 for obtaining the difference between first and second panoramic pictures, and a human figure extracting section 243 for extracting a human figure picture from the difference picture extracted by the difference extracting section 143. The difference extracting section 143 includes a binary image generating section 143a for generating a difference picture as a binary image by performing threshold processing.

The human figure extracting section 243 includes a histogram calculating section 243a for calculating a vertical and horizontal histograms, which respectively represent the accumulations of pixel values at the respective x- and y-coordinates in the vertical and horizontal directions, from the binary difference picture generated by the binary image generating section 143a, a range extracting section 243b for extracting ranges of a predetermined threshold or more from the vertical and horizontal histograms calculated by the histogram calculating section 243a to extract ranges in which participants exist in the vertical and horizontal directions, and an area determining section 243c for determining a rectangular area where each participant in the conference exists on the basis of the ranges in which the participants exist in the vertical and horizontal direction which are extracted by the range extracting section 243b.

The camera parameter calculating section 44 calculates camera parameters for each rectangular area (human figure picture) extracted by the human figure picture extracting section 43 (step S104). The camera parameter calculating section 44 calculates a first camera parameter (a camera parameter associated with a field angle of the camera view, i.e., zoom data) with which each rectangular area is shot by the camera 1 in a proper size from the size of each rectangular area. The camera parameter calculating section 44 calculates a second camera parameter (a camera parameter associated with an imaging direction, i.e., panning/tilting data) with which shooting is properly performed such that each rectangular area is located in the center of a frame from the position of each rectangular area. The calculated camera parameters are stored in the camera parameter storage section 61. With the operation, the operation of the human figure extracting section 4 is terminated.

With the above arrangement, the human figure extracting section 4 can calculate camera parameters associated with the imaging direction and field angle of the camera view with which each participant in a video conference can be properly shot. In this embodiment, as described above, when the human figure picture extracting section 43 extracts a human figure picture, the first panoramic picture generating section 41 generates a panoramic picture of a conference room with no participants, and the second panoramic picture generating section 42 generates a panoramic picture when the participants take their seats.

If the participants in the conference change their seats after a break or participants cannot be captured with calculated parameters because the participants move during the conference, it is required that the human figure extracting section 4 be activated again to extract human figure pictures and calculate camera parameters again. If, however, the conference is in progress or some participants stay in the conference room even during a break, a panoramic picture in a state in which no participant exists in the conference room cannot be generated again.

Another example of the operation of the human figure extracting section 4 in such a case will be described with reference to FIGS. 5A to 5C. If the human figure extracting section 4 is activated while all the participants are already seated, the first panoramic picture generating section 41 generates a first panoramic picture including human figures by the processing in step S101, as shown in FIG. 5A. Subsequently, the second panoramic picture generating section 42 generates a second panoramic picture by the processing in step S102, as shown in FIG. 5B.

There is a slight time lag between the time point at which the first panoramic picture is generated and the time point at which the second panoramic picture is generated, and participants in the conference move more or less during this time lag. For this reason, this movement can be extracted as the difference between the first and second panoramic pictures (FIG. 5C) by calculating a histogram in the vertical direction. Therefore, the human figure picture extracting section 43 extracts a rectangular area where each participant exists by the processing in step S103 in accordance with the extracted difference picture. The camera parameter calculating section 44 then calculates camera parameters with which each participant is properly shot by the processing in step S104.

The operation of the human figure instructing section 5 will be described next with reference to the flow chart of FIG. 6. The human figure picture instructing section 51 reads out a human figure picture of each participant from the human figure picture storage section 62, displays each readout human figure picture on the screen of the display device 51a, and receives a request from the operator. The operator operates the input section 51b such as a mouse or keyboard to select a specific participant in the conference room which is to be shot by the camera 1 (step S201).

According to a selection method used in this case, while human figure pictures of all the participants are displayed on the screen of the display device 51a, the operator clicks the human figure picture of a participant to be shot by the camera 1 with a mouse as the input section 51b. According to another method, the operator operates arrow keys of a keyboard as the input section 51b to move the cursor onto the human figure picture of a participant to be shot, and then presses the decision key of the keyboard.

The human figure picture instructing section 51 searches the camera parameter storage section 61 for camera parameters corresponding to the human figure picture selected in this manner, and transfers the readout camera parameters to the camera driving section 2 (step S202) The camera driving section 2 drives the camera 1 in accordance with the received camera parameters to control panning, tilting, and zooming of the camera 1 (step S203). In this manner, the direction and field angle of the view of the camera 1 are controlled to locate the participant selected by the operator in the center of a frame and capture him/her in a proper size.

The picture of the participant generated by the camera 1 is displayed on the screen of the monitor screen 3 and transmitted to another video conference point by a transmitting section (not shown).

In this embodiment, the human figure pictures stored in the human figure picture storage section 62 are set as selection keys for the participants. Instead of this operation, the operator can store human figure pictures and the names of participants in the human figure picture storage section 62 in correspondence with each other by inputting the names of the participants corresponding to the human figure pictures to the human figure extracting section 4 when the human figure pictures are extracted. With this operation, in selecting a participant in step S201, the participant names are displayed on the screen of the display device instead of human figure pictures, and a participant to be shot can be selected with the participant name.

The camera parameters stored in the camera parameter storage section 61 indicate the direction of a participant and the magnitude of the field angle of the camera view at the time point when the second panoramic picture is generated by the second panoramic picture generating section 42. If, therefore, the posture of the participant changes or moves sideways after the second panoramic picture is generated, the direction and field angle of the camera view change. To cope with this situation, the operator may make fine adjustments after camera parameters are searched out by the camera parameter searching section 52 and the camera 1 is directed toward the participant. Instead of fine adjustments made by the operator, a human figure may be automatically tracked and located in the center of the camera by detecting the movement of the human figure.

As has been described above, according to the present invention, since a participant to be shot can be designated with a human figure picture, the participant can be easily designated. This makes it possible to simplify the operation for camera control. In addition, since camera parameters are calculated on the basis of a human figure picture, the imaging direction and field angle of the camera view can be controlled to shoot a participant as a target in the center of a frame in a proper size. This allows smooth progression of the video conference. Furthermore, since the operator designates a participant to be shot in accordance with human figure pictures, erroneous detection of a participant who is not to be shot can be prevented.

What is claimed is:

1. A video conference system comprising:

a camera whose imaging direction and field angle of the view can be changed;

camera driving means for controlling the imaging direction and field angle of the view of said camera in accordance with camera parameters;

human figure extracting means for extracting a human figure picture of each participant from a picture obtained by capturing an entire conference room with said camera, and calculating camera parameters associated with the imaging direction and field angle of the camera view with respect to each participant on the basis of the extracted human figure picture;

human figure picture storage section for storing the human figure picture extracted by the human figure extracting means;

camera parameter storage means for storing the camera parameters calculated by said human figure extracting means; and human figure instructing means for reading out camera parameters corresponding to a human figure picture selected as a shooting target from the human figure pictures stored in said human figure picture storage means from said camera parameter storage section, and outputting the camera parameters to said camera driving means.

2. A system according to claim 1, wherein said human figure extracting means comprises:

first panoramic picture generating means for generating a first panoramic picture depicting the entire conference room from plural pictures inside the conference room captured in all imaging directions by said camera at a first timing;

second panoramic picture generating means for generating a second panoramic picture depicting the entire conference room from plural pictures inside the conference room captured in all imaging directions by said camera at a second timing different from the first timing;

human figure picture extracting means for extracting a human figure picture of each participant on the basis of a difference between the first and second panoramic pictures respectively output from said first and second panoramic picture generating means, and storing the extracted human figure picture in said human figure picture storage means; and camera parameter calculating means for calculating camera parameters associated with an imaging direction and field angle of the camera view with which each participant is captured by said camera, and stores the obtained camera parameters in said camera parameter storage means.

3. A system according to claim 2, wherein said first panoramic picture generating means generates the first panoramic picture on the basis of pictures inside the conference room at the first timing at which no participant captured by said camera is present, and said second panoramic picture generating means for generating the second panoramic picture on the basis of pictures inside the conference room at the second timing at which the participants captured by said camera are seated.

4. A system according to claim 2, wherein said first panoramic picture generating means generates the first panoramic picture on the basis of pictures inside the conference room at the first timing at which the participants captured by said camera are seated, and said second panoramic picture generating means for generating the second panoramic picture on the basis of pictures inside the conference room at the second timing after said first panoramic picture generating means generates the first panoramic picture.

5. A system according to claim 2, wherein said human figure picture extracting means comprises:

difference extracting means for obtaining a difference between the first and second panoramic pictures respectively output from said first and second panoramic picture generating means; and human figure extracting means for extracting a human figure picture from the difference picture extracted by said difference extracting means.

6. A system according to claim 5, wherein said difference extracting means comprises binary image generating means for generating a difference picture as a binary image by performing threshold processing, and said human figure extracting means comprises:

histogram calculating means for calculating vertical and horizontal histograms respectively indicating accumulations of pixel values at every x- and y-coordinates in vertical and horizontal directions from the binary difference picture generated by said binary image generating means;

range extracting means for extracting a range of not less than a predetermined threshold from the vertical and horizontal histograms calculated by said histogram calculating means, and extracting participant existing ranges in the vertical and horizontal directions; and area determining means for determining a rectangular area where each participant exists on the basis of the participant existing range in the vertical and horizontal directions which are extracted by said range extracting means.

7. A system according to claim 1, wherein said human figure instructing means comprises:

human figure picture instructing means for selecting one human figure picture from information associated with the human figure pictures stored in said human figure picture storage means; and camera parameter searching means for reading out camera parameters corresponding to the human figure picture selected by said human figure picture instructing means, and outputting the camera parameters to said camera driving means.

8. A system according to claim 7, wherein said human figure picture instructing means comprises:

a display device for displaying information associated with human figure information; and an input section with which an operator selects/inputs a human figure picture in accordance with the information displayed on said display device.

9. A video conference system comprising:

a camera whose imaging direction and field angle of the view can be changed;

camera driving means for controlling the imaging direction and field angle of the view of said camera in accordance with camera parameters;

human figure picture extracting means for extracting a human figure picture of each participant from a picture obtained by capturing an entire conference room with said camera;

parameter calculating means for calculating camera parameters associated with an imaging direction and field angle of the camera view with respect to each participant on the basis of the human figure picture output from said human figure picture extracting means; and human figure instructing means for outputting camera parameters corresponding to the human figure picture selected as a shooting target from an output from said human figure picture extracting means.

10. A system according to claim 9, wherein said human figure extracting means comprises:

panoramic picture generating means for generating first and second panoramic pictures depicting the entire conference room from plural pictures inside the conference room captured by said camera in all imaging directions at first and second timings;

human figure picture extracting means for extracting a human figure picture of each participant on the basis of a difference between the first and second panoramic pictures output from said panoramic picture generating means; and camera parameter calculating means for calculating camera parameters associated with the imaging direction and field angle of the camera view with which each participant is captured by said camera, on the basis of the human figure picture output from said human figure picture extracting means.

11. A method for video conferencing comprising the steps of:

positioning a camera in a conference room to control an imaging direction and field angle of view of the camera;

capturing the conference room with the camera;

calculating parameters associated with the imaging direction and field angle of view;

extracting a human figure from a picture of one of a plurality of persons in the conference room obtained when capturing the conference room; and positioning the camera on one of the plurality of persons in the conference room based on the human figure and the camera parameters.

12. The method of claim 11, wherein extracting a human figure comprises:

generating a first panoramic picture at a first timing;

generating a second panoramic picture at a second timing; and extracting a picture of a human figure based on the difference between the first and second panoramic pictures.

13. A video conference system comprising:

a camera whose imaging direction and field angle of view can be changed;

a camera driver for controlling the imaging direction and field angle of view of said camera in accordance with camera parameters;

a human figure extractor for extracting a human figure picture of each participant from a panoramic picture obtained by capturing an entire conference room with said camera, and calculating said camera parameters associated with the imaging direction and filed angle of view with respect to each participant on the basis of the extracted human figure picture;

a human figure picture storage device for storing the human figure picture extracted by the human figure extractor;

a camera parameter storage device for storing said camera parameters calculated by said human figure extractor; and a human figure instructor for reading out camera parameters, said camera parameters corresponding to a human figure picture selected from the human figure pictures stored in said human figure picture storage device, from said camera parameter storage device, and outputting said camera parameters to said camera driver.

* * * * *